3,732,092
HEAT TREATMENT OF IRON POWDER

George E. Wieland, Jr., and Eugene M. Rudzki, Bethlehem, Pa., assignors to Bethlehem Steel Corporation
Filed Mar. 31, 1972, Ser. No. 239,970
Int. Cl. B22f 9/00
U.S. Cl. 75—.5 BA                                                      8 Claims

ABSTRACT OF THE DISCLOSURE

Raw iron powders are blended so that the atomic ratio of the reducible oxygen to the carbon content of the blend is within the range of 1.2 to 1.6. The raw powder blend is heat treated in a furnace, without an auxiliary atmosphere, to reduce the carbon and reducible oxygen contents of the powder.

BACKGROUND OF THE INVENTION

This invention relates to a method of treating raw iron powder, and more particularly to a method of treating raw iron powder to reduce the reducible oxygen content thereof to a maximum of 0.40 wt. percent and the carbon content to a maximum of 0.10 wt. percent. By "raw powder" is meant iron powder having reducible oxygen and/or carbon contents above 0.40 and 0.10 wt. percent, respectively. By "reducible oxygen" is meant the oxygen present as oxides reducible by hydrogen at 2100° F., e.g. iron oxide, as distinguished from the total oxygen in the powder. Thus, the oxygen present in compounds such as silica and alumina contained in the iron powder is not included in the "reducible oxygen" content of the powder. The "reducible oxygen" is determined by the Metal Powder Industrial Federation Standard 2–64, "Determination of Hydrogen Loss of Metal Powders," and includes a correction for loss of carbon and sulfur during analysis.

High quality molding-grade iron powder is used in the production of articles in which the iron powder is placed in a mold, subjected to pressure, removed from the mold, and then either sintered or hot forged. This molding-grade powder is required to have a maximum carbon content of about 0.10 wt. percent and a maximum reducible oxygen content of about 0.40 wt. percent, as higher carbon contents may cause the powder to have excessive brittleness and poor coherence, while higher oxygen contents may result in excessive shrinkage during sintering.

Molding-grade iron powders are usually made by either atomizing molten iron with air or water or by grinding direct-reduced beneficiated iron ore. Powders so produced are, however, characterized by excessive hardness and have carbon and reducible oxygen contents above the acceptable upper limits for molding-grade powders. It is therefore necessary to heat treat such powders to soften them and to reduce their carbon to less than 0.10 wt. percent and their reducible oxygen contents to less than 0.40 wt. percent.

It is broadly old to heat treat raw iron powders in a furnace to which no reducing or oxidizing atmosphere has been added. During such heat treatment, oxygen and carbon escape from the heated powders as a mixture of carbon monoxide and carbon dioxide. While this treatment may, on occasion, result in a powder having the aforementioned acceptable percentages of both carbon and oxygen, in general the percentage of only one of these two elements has been lowered to an acceptable level. As a result, either a reducing or an oxidizing atmosphere must often be introduced into the heat-treating furnace to lower the percentage of the other element to an acceptable level. The use of such an auxiliary atmosphere increases the capital and operating costs of the process.

It is an object of this invention to provide a method of heat treating iron powder, without any auxiliary atmosphere, whereby both the carbon and reducing oxygen contents thereof are consistently reduced to a maximum of 0.10 wt. percent and 0.40 wt. percent, respectively.

SUMMARY OF THE INVENTION

We have discovered that the foregoing object can be obtained by providing raw iron powder having an atomic ratio of the reducible oxygen to the carbon content within the range of about 1.2 to 1.6. Suitable powder may be provided by blending a mixture of raw powders having various reducible oxygen and carbon contents.

The raw powder so provided is next heated in a furnace, to which no reducing or oxidizing atmosphere has been added, to between about 1600 and 2000° F. for a time sufficient to reduce the carbon and reducible oxygen contents to the desired levels. At 1600° F., a minimum time of about 3 hours is required, while at 2000° F. a minimum time of only about 15 minutes may be required. The carbon monoxide and carbon dioxide generated within the furnace during the heating provide a positive pressure which prevents the ingress of air into the furnace. A maximum reducible oxygen content of 0.40 wt. percent and a maximum carbon content of 0.10 wt. percent are attainable throughout the entire range of reducible oxygen to carbon ratios, i.e. from 1.2 to 1.6 when the powder is heated to 2000° F. for about 15 minutes, but as the maximum temperature to which the powder is heated approaches 1600° F. for about 3 hours, a maximum carbon content of 0.10 wt. percent is attainable only if the required minimum value of the reducible oxygen to carbon ratio progressively increases to 1.3.

DESCRIPTION OF THE PREFERRED EMBODIMENT

Figure 1:
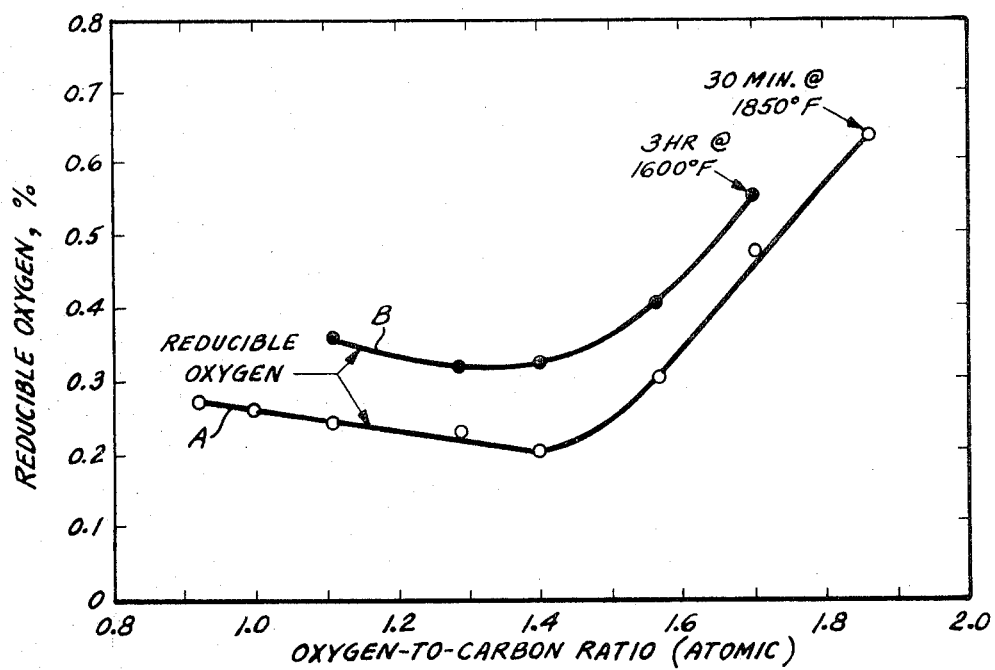
FIG. 1 is a pair of curves showing the reducible oxygen content of blended iron powder, after heat treatment, as a function of the atomic reducible oxygen-to-carbon ratio of the raw powder.
Figure 2:
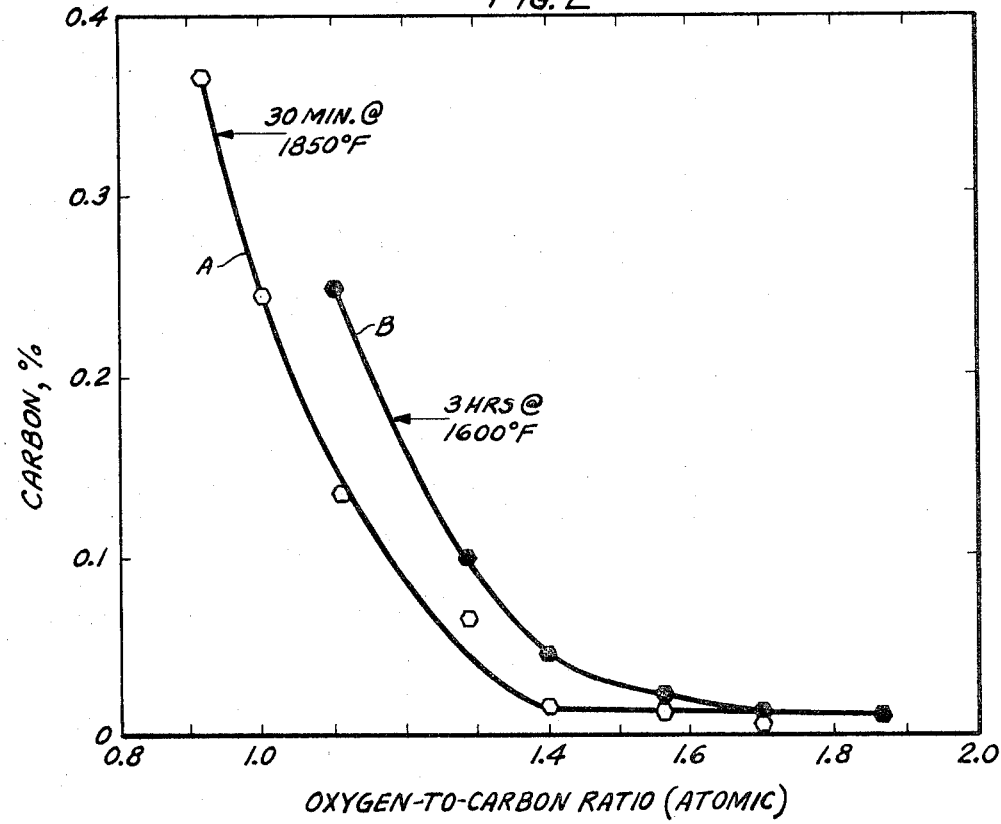
FIG. 2 is a similar pair of curves showing the carbon content of blended iron powder, after heat treatment, as a function of the atomic reducible oxygen-to-carbon ratio of the raw powder.

To obtain the data used to plot FIGS. 1 and 2, two grades of iron powder were prepared. One grade contained 0.016 wt. percent carbon and 2.22 wt. percent oxygen. The other grade contained 4.12 wt. percent carbon and 1.97 wt. percent reducible oxygen. These grades were then blended to obtain a plurality of blends having an atomic reducible oxygen-to-carbon ratio varying from 0.91 to 1.86. Curves A in the figures represent powders which were heat treated at about 1850° F. for 30 minutes while curves B represent powders which were heat treated at about 1600° F. for 3 hours.

As can be seen from FIGS. 1 and 2, blends of powder having an atomic reducible oxygen-to-carbon ratio of 1.2 to 1.6 when heat treated at 1850° F. for 30 minutes have a final reducible oxygen content of about 0.30 wt. percent max, and a carbon content of 0.10 wt. percent max. Blends of powders having an atomic reducible oxygen-to-carbon ratio of 1.3 to 1.6 when heat treated at 1600° F. for 3 hours have a maximum reducible oxygen content of about 0.40 wt. percent and a maximum carbon content of 0.10 wt. percent. As can be seen, curves A represent lower reducible oxygen and carbon values for all ratios; hence, a heat treatment at about 1850° F. for 30 minutes is preferred over a heat treatment at 1600° F. for 3 hours.

Preferably, the atomic ratio of the reducible oxygen to the carbon is 1.3 to 1.5 and the powder is heated to about 1850° F. for about 30 minutes. The powder so produced has a maximum reducible oxygen content of about 0.30 wt. percent and a maximum carbon content of about 0.05 wt. percent.

As a specific example of our invention, a blend of raw iron powders of about 100 mesh was prepared comprising 72 wt. percent of a powder containing 0.016 wt. percent carbon and 2.22 wt. percent reducible oxygen and 28 wt. percent of a powder containing 4.12 wt. percent carbon and 1.97 wt. percent reducible oxygen. The blend, which has a reducible oxygen-to-carbon ratio of 1.4, was heated at 1850° F. for 30 minutes. The final product had a reducible oxygen content of about 0.20 wt. percent and a carbon content of about 0.02 wt. percent.

While the powder of the specific example was provided by blending several powders of different carbon and oxygen contents, it is possible to provide a powder having the desired oxygen-to-carbon ratio directly by careful control of the initial powder-producing process, e.g. the water-atomization process.

We claim:

1. A method of treating iron powder, comprising:
   (a) providing iron powder in which the atomic ratio of the reducible oxygen to the carbon content is within the range of about 1.2 to 1.6; and
   (b) heating said powder in a furnace, to which no auxiliary atmosphere has been added and in which the ingress of air is prevented, to between about 1600 and 2000° F. for a time sufficient to reduce the reducible oxygen content of said powder to 0.40 wt. percent max. and the carbon content of said powder to 0.10 wt. percent max., the minimum value of said ratio progressively increasing from 1.2 to 1.3 as the maximum temperature to which said powder is heated approaches 1600° F.

2. A method as recited in claim 1, in which said powder is heated for at least 3 hours at 1600° F., and in which the required time uniformly decrases to a minimum of about 15 minutes at 2000° F.

3. A method as recited in claim 1, in which said powder is heated to about 1850° F. for about 30 minutes.

4. A method as recited in claim 1, in which said ratio is within the range of 1.3 to 1.5, and said powder is heated to about 1850° F. for about 30 minutes.

5. A method of treating iron powder, comprising:
   (a) blending a mixture of iron powders containing the elements iron, oxygen and carbon whereby the atomic ratio of the reducible oxygen to the carbon content is within the range of about 1.2 to 1.6; and
   (b) heating said mixture in a furnace, to which no auxiliary atmosphere has been added and in which the ingress of air is prevented, to between about 1600 and 2000° F. for a time sufficient to reduce the reducible oxygen content of said powder to 0.40 wt. percent max. and the carbon content of said powders to 0.10 wt. percent max., the minimum value of said ratio progressively increasing from 1.2 to 1.3 as the maximum temperature to which said powders are heated approaches 1600° F.

6. A method as recited in claim 5, in which said power is heated for at least 3 hours at 1600° F., and in which the required time uniformly decreases to a minimum of about 15 minutes at 2000° F.

7. A method as recited in claim 5, in which said blended mixture is heated to about 1850° F. for about 30 minutes.

8. A method as recited in claim 5, in which said ratio is within the range of 1.3 to 1.5 and said blended mixture is heated to about 1850° F. for about 30 minutes.

References Cited
UNITED STATES PATENTS

| | | | |
|---|---|---|---|
| 3,419,383 | 12/1968 | Hatcher | 75—0.5 BA |
| 3,385,694 | 5/1968 | Josefsson et al. | 75—0.5 BA |
| 3,368,890 | 2/1968 | Schroeder et al. | 75—0.5 BA |
| 3,353,951 | 11/1967 | Shafer et al. | 75—0.5 BA |
| 3,073,695 | 1/1963 | Silbereisen et al. | 75—0.5 BA |
| 3,069,758 | 12/1962 | Wulff | 75—0.5 BA |

WAYLAND W. STALLARD, Primary Examiner